United States Patent
Onishi et al.

(10) Patent No.: US 8,057,744 B2
(45) Date of Patent: Nov. 15, 2011

(54) BUBBLE COLUMN-TYPE FISCHER-TROPSCH SYNTHESIS SLURRY BED REACTION SYSTEM

(75) Inventors: Yasuhiro Onishi, Tokyo (JP); Kenichiro Fujimoto, Tokyo (JP); Masaru Ihara, Yokohama (JP); Yoshifumi Suehiro, Kawasaki (JP); Yasumasa Morita, Tokyo (JP); Kiyoshi Inaba, Ichikawa (JP); Toshio Shimizu, Satte (JP); Osamu Iwamoto, Satte (JP)

(73) Assignees: Nippon Steel Engineering Co., Ltd., Tokyo (JP); Japan Oil, Gas and Metals National Corporation, Kanagawa-ken (JP); Sekiyushigen Kaihatsu Kabushiki Kaisha, Tokyo (JP); Cosmo Oil Co., Ltd., Tokyo (JP); Inpex Corporation, Tokyo (JP)

( * ) Notice: Subject to any disclaimer, the term of this patent is extended or adjusted under 35 U.S.C. 154(b) by 428 days.

(21) Appl. No.: 12/097,161

(22) PCT Filed: Dec. 14, 2005

(86) PCT No.: PCT/JP2005/022975
§ 371 (c)(1),
(2), (4) Date: Apr. 15, 2009

(87) PCT Pub. No.: WO2007/069317
PCT Pub. Date: Jun. 21, 2007

(65) Prior Publication Data
US 2009/0220389 A1    Sep. 3, 2009

(51) Int. Cl.
*B01J 8/18* (2006.01)
*F27B 15/08* (2006.01)
(52) U.S. Cl. ........ 422/140; 422/145; 422/146; 422/147

(58) Field of Classification Search .............. 422/140, 422/145, 146, 147
See application file for complete search history.

(56) References Cited

U.S. PATENT DOCUMENTS 3,901,660 A * 8/1975 Ohorodnik et al. ........... 422/140
(Continued)

FOREIGN PATENT DOCUMENTS

EP     0450860     10/1991
(Continued)

OTHER PUBLICATIONS

International Search Report and Written Opinion for International Application No. PCT/JP2005/022975 filed Dec. 14, 2005. Decision on Grant for RU Application No. 2008123815/04. Onishi, Yasuhiro et al., "Bubble Column-Type Fischer-Tropsch Synthesis Slurry Bed Reaction System".

(Continued)

*Primary Examiner* — Walter Griffin
*Assistant Examiner* — Lessanework Seifu
(74) *Attorney, Agent, or Firm* — Dorsey & Whitney LLP

(57) ABSTRACT

According to an exemplary embodiment, a bubble column-type slurry bed Fischer-Tropsch synthesis reaction process can be provided, in which synthesis gas supplied continuously from the bottom of a reactor contacts suspended catalyst particles to form liquid hydrocarbons, gaseous hydrocarbons and water. Additionally, a slurry of suspended liquid products and catalyst particles can move from the reactor to the lower portion of a separation vessel to separate the catalyst particles and gaseous products. Further, a process can be provided in which the liquid products formed are sent to the separation vessel a process in which liquid products can be derived. Additionally, a process can be provided in which a slurry in which catalyst particles are concentrated is derived from the bottom of the separation vessel and circulated to the bottom of the reactor, are driven by the driving force of synthesis gas without using an external drive power source.

11 Claims, 1 Drawing Sheet

U.S. PATENT DOCUMENTS

| | | | |
|---|---|---|---|
| 5,527,473 A * | 6/1996 | Ackerman | 210/767 |
| 5,770,629 A | 6/1998 | Degeorge et al. | |
| 5,844,006 A | 12/1998 | Jager et al. | |
| 5,961,933 A | 10/1999 | Casanave et al. | |
| 6,068,760 A | 5/2000 | Benham et al. | |
| 6,096,789 A | 8/2000 | Clerici et al. | |
| 6,121,333 A | 9/2000 | Clerici et al. | |
| 6,348,510 B1 | 2/2002 | Maretto et al. | |
| 6,462,098 B1 | 10/2002 | Vogel et al. | |

FOREIGN PATENT DOCUMENTS

| | | |
|---|---|---|
| JP | 10-66859 | 3/1998 |
| JP | 11-349496 | 12/1999 |
| RU | 2190588 C2 | 10/2002 |

* cited by examiner

BUBBLE COLUMN-TYPE FISCHER-TROPSCH SYNTHESIS SLURRY BED REACTION SYSTEM

TECHNICAL FIELD

The present invention relates to a bubble column-type slurry bed reaction system and apparatus that convert a synthesis gas composed of hydrogen and carbon monoxide to liquid hydrocarbons product in the presence of a suspended Fischer-Tropsch synthesis catalyst.

BACKGROUND ART

A Fischer-Tropsch synthesis reaction involves the reaction of a synthesis gas composed of hydrogen and carbon monoxide in the presence of a solid catalyst to yield a mixture of paraffin and olefin hydrocarbons having a comparatively wide molecular weight distribution. Liquid hydrocarbons in particular are attracting attention as a clean-burning automobile fuel.

Fischer-Tropsch synthesis reactions are characterized as being extremely exothermic. For example, the calorific value per kg-mol of carbon monoxide in the following general formula (1) representing the synthesis of saturated hydrocarbons is about 40 Mcal.

$$nCO + 2nH_2 \rightarrow (CH_2)_n + nH_2O \quad (1)$$

Thus, one of the most important factors of processes involving the synthesis of liquid hydrocarbons using the Fischer-Tropsch synthesis method is the efficient removal of the heat of the reaction from the reactor.

Fixed bed heat exchange-type multi-tubular reactors, fluidized bed reactors and slurry bed reactors have been proposed as types of Fischer-Tropsch synthesis reactors that enable industrial synthesis of liquid hydrocarbons from the synthesis gas while removing the heat of the reaction. Here, a slurry bed reaction system is a fluid reaction system in which three phases consisting of solid, liquid and gas phases are present that introduce the synthesis gas into the suspension of a liquid medium and catalyst particles, and it is remarkably advantageous in comparison with other fixed bed systems in terms of the uniformity of temperature profile in the reactor.

The use of a bubble column-type reactor has been advocated for slurry bed Fischer-Tropsch synthesis reaction systems, and catalyst particles are maintained in a suspended state in the form of a slurry by kinetic energy of the synthesis gas that rises from the bottom of the reactor in such a reactor (see, for example, Patent Documents 1 to 3).

One of the major subject of a bubble column-type slurry bed reaction system in which solid, liquid and gas phases are present is how the liquid hydrocarbon products can be efficiently separated and derived from the three-phase slurry, and the use of filtration separation in the main reactor (see, for example, Patent Documents 3 and 4), filtration separation in a separate vessel connected to the main reactor with a conduit (see, for example, Patent Document 5), and hydrocyclone separation (see, for example, Patent Document 6) have been advocated for this purpose.

Patent Document 1: European Patent No EU 450,860
Patent Document 2: U.S. Pat. No. 6,348,510
Patent Document 3: U.S. Pat. No. 6,462,098
Patent Document 4: U.S. Pat. No. 5,844,006
Patent Document 5: U.S. Pat. No. 5,770,629
Patent Document 6: U.S. Pat. No. 6,121,333

DISCLOSURE OF THE INVENTION

However, in the case of filtration separation in the main reactor as advocated in Patent Documents 3 and 4, since a filter is used for the filtration means for separating the catalyst and liquid hydrocarbon products from the slurry, the occurrence of clogging of catalyst particles in the filter cannot be avoided. Therefore, a large number of separation and derivation pathways are provided and separation and derivation are carried out by mutually switching these pathways while removing catalyst particles that have become clogged by allowing liquid to flow back through clogged filter separation and derivation pathways. Consequently, the operating system involved in separation and derivation as well as the apparatus ends up being complex. In addition, since the catalyst particles become powdered when clogging/removal is repeated, in addition to causing deterioration of performance, there was also the possibility of stable operation being difficult. Moreover, a combination of coiled cooling tubes and downward tubes has been disclosed to ensure temperature uniformity in slurry reactors suitable for efficiently removing the heat of the reaction, and these serve to evenly remove heat in the direction of the vertical axis of the reactor, however resulting in greater complexity of the apparatus configuration.

In addition, in the case of filtration separation in a separate vessel as described in Patent Document 5, a filter is also used as a filtration means for separating the catalyst and liquid hydrocarbon products from the slurry. Consequently, there is still the occurrence of problems accompanying clogging of the filter by catalyst particles. In addition, although a slurry bed reactor is disclosed that is suitable for efficiently removing the heat of the reaction, there is no disclosure regarding the cooling mechanism.

Moreover, in the case of hydrocyclone separation as described in Patent Document 6, since external drive power source such as a pump and so forth is used during separation and derivation of the catalyst and liquid hydrocarbon products from the slurry, the catalyst particles are subjected to a high load leading to deterioration of performance caused by attrition of the catalyst particles, and resulting in the problem of decreased production efficiency of FT synthesis oil. In addition, there is also a problem of it being difficult to reduce costs due to the higher running costs caused by the external drive power source. In addition, although Patent Document 6 discloses a slurry bed reactor that is suitable for efficient removal of the heat of the reaction, there is no disclosure regarding the cooling mechanism.

As has been explained above, operating systems that separate and derive the catalyst and liquid hydrocarbon products from the slurry composed of solid, liquid and gas phases in a bubble column-type slurry bed reaction system are complex, therefore creating the need for improvement by the use of a simpler system. In addition, since it is extremely important to synthesize liquid hydrocarbons by the Fischer-Tropsch synthesis reaction in the state in which a uniform temperature profile is maintained in the direction of the vertical axis and radial direction, there is a need for the synthesis reaction wherein a more uniform temperature profile is maintained.

Therefore, in order to solve these problems, the object of the present invention is to provide a bubble column-type slurry bed reaction system and apparatus capable of simplifying an operating system to be used to synthesize liquid hydrocarbons by the Fischer-Tropsch synthesis reaction and separate and derive the catalyst and liquid hydrocarbon products from the slurry composed of gas, liquid and solid phases, and reducing deterioration caused by the attrition of catalyst particles.

In addition to the aforementioned object, another object of the present invention is to provide a bubble column-type slurry bed reaction system and apparatus capable of synthesizing liquid hydrocarbons by the Fischer-Tropsch synthesis reaction while maintaining a uniform temperature profile in the vertical and radial directions.

In order to solve the aforementioned problems, the inventors of the present invention conducted extensive studies on a method for externally circulating slurry between a bubble column-type slurry bed reactor (Fischer-Tropsch synthesis reactor) and a separation vessel, and a method for cooling the bubble column-type slurry bed reactor, thereby leading to acquisition of the bubble column-type slurry bed reaction system of the present invention.

Namely, a first aspect of the present invention is: (1) a bubble column-type slurry bed reaction system in the Fischer-Tropsch synthesis reaction system for producing liquid hydrocarbons by contacting the synthesis gas composed of hydrogen and carbon monoxide with catalyst particles; wherein, (i) a bubble column-type slurry bed Fischer-Tropsch synthesis reaction process, in which synthesis gas supplied continuously from the bottom of a reactor and catalyst particles suspended in the liquid fractions are contacted to form liquid hydrocarbons, gaseous hydrocarbons and water, (ii) a process in which the slurry of suspended liquid products formed in the Fischer-Tropsch synthesis reaction process and catalyst particles moves to the lower portion of a separation vessel through a downwardly inclined transfer pipe installed between the reactor and the lower portion of the separation vessel to separate the catalyst particles and liquid products, (iii) a process in which the gaseous products formed in the Fischer-Tropsch synthesis reaction process is sent to the upper portion of the separation vessel through a connecting pipe installed above the downwardly inclined transfer pipe, and derived from its apex, (iv) a process in which the liquid products from which the majority of the catalyst particles from the separation vessel have been separated are derived, and (v) a process in which the slurry in which catalyst particles are concentrated is derived from the bottom of the separation vessel and circulated to the bottom of the reactor, is driven by the driving force (air lift) of synthesis gas introduced from the bottom of the reactor and rises through the slurry bed reactor without using an external drive power source for circulation, and the formed liquid hydrocarbon products, gaseous hydrocarbon products and water are separated and derived without using an external drive power source for separation.

In addition, a second aspect of the present invention is a bubble column-type slurry bed reaction system according to the first aspect having: (2) a process in which the temperature inside the reactor is controlled by a plurality of bayonet-type cooling tubes installed vertically from the upper portion of the bubble column-type slurry bed reactor and composed of cooling medium feed inner tubes and heat exchange outer tubes, and enabling the uniform removal of heat in the radial direction inside the reactor.

In the bubble column-type slurry bed reaction system of the present invention, the pressure of the reactor is 1 to 4 MPaG, and the superficial gas velocity is 0.05 to 0.2 m/second. In addition, 99% or more of those catalyst particles introduced to the lower portion of the separation vessel from said reactor having a particle diameter of 20 μm or more are circulated to said reactor. In the separation vessel of the present invention, which is connected to the bubble column-type slurry bed reactor by a downwardly inclined transfer pipe and has a slurry derivation pipe (slurry circulation pathway) that circulates catalyst-concentrated slurry to said reactor, the liquid rise velocity inside said separation vessel is controlled to be 0.4 times or less the sedimentation velocity of 20 μm catalyst particles or less by a catalyst-concentrated slurry derivation control valve installed in the slurry derivation pipe (slurry circulation pathway) between said separation vessel and said reactor, a derivation control valve for the liquid reaction products, from which the majority of catalyst particles have been separated, installed in a liquid reaction product derivation pipe extending from the separation vessel, and a differential pressure control valve installed in a connecting pipe between the separation vessel and the upper gas phase space of said reactor.

In the reactor cooling process of the present invention that controls the temperature inside the reactor with a plurality of bayonet-type cooling tubes by feeding water (for example, boiler water) into the inner tubes, in addition to controlling the temperature inside the reactor to be at 210 to 280° C., steam at a temperature of 200 to 270° C. and pressure of 2 to 6 MPaG is obtained from the outer cooling tube outlet.

A third aspect of the present invention is (3) the Fischer-Tropsch synthesis reaction apparatus provided with a bubble column-type slurry bed Fischer-Tropsch synthesis reactor that forms liquid hydrocarbons, gaseous hydrocarbons and water by contacting synthesis gas continuously supplied from a gas distributor installed in the bottom of the reactor with suspended catalyst particles; wherein, a circulation separation mechanism is provided that is driven by the driving force (air lift) of the synthesis gas rising through the slurry bed reactor introduced from the bottom of said reactor without using an external drive power source for circulation, and separates and derives the formed liquid hydrocarbon products and gaseous hydrocarbon products without using an external drive power source for separation.

The said circulation separation mechanism has (i) the said reactor, (ii) a separation vessel that separates catalyst particles and liquid products by transferring a slurry, in which a liquid products formed in said reactor and catalyst particles are suspended, through a downwardly inclined transfer pipe connected between said reactor and the lower portion of a separation vessel, (iii) a gaseous products derivation portion that transfers a gaseous products formed in the reactor to the upper portion of the separation vessel through a connecting pipe installed above the downwardly inclined transfer pipe, and derives the gaseous products from its apex, (iv) the liquid products derivation portion that derives the liquid products from said separation vessel, and (v) a circulation pathway unit that derives slurry in which catalyst particles have been concentrated from the bottom of said separation vessel and circulates it to the bottom of said reactor. In the said circulation separation mechanism, the reaction pressure inside the reactor can be controlled to be in the range of 1 to 4 MPaG and the superficial gas velocity can be controlled to be in the range of 0.05 to 2 m/second. In addition, in said circulation separation mechanism, 99% or more of those particles introduced to the lower portion of the separation vessel having a particle diameter of 20 μm or more can be circulated to said reactor. Moreover, in said circulation mechanism, the liquid rise velocity in the separation vessel can be controlled to be in the range of 0.4 times or less the sedimentation velocity of catalyst particles having a particle diameter of 20 μm by a catalyst-concentrated slurry derivation volume control valve installed in the circulation pathway unit, a liquid reaction products derivation control valve installed in the liquid products derivation portion of the separation vessel, and a differential pressure control valve installed in a connecting pipe between the separation vessel and the upper gas phase space of the reactor.

In addition, a fourth aspect of the present invention is the Fischer-Tropsch synthesis reaction apparatus according to the third aspect that is provided with a heat removal mechanism that controls the temperature inside the reactor and enables uniform removal of heat in the radial direction and vertical axis direction inside said reactor.

The heat removal mechanism has a plurality of cooling tubes comprised of cooling medium feed inner tubes and heat exchange outer tubes installed vertically from the upper portion of the reactor, and by feeding water into the inner tube inlet in the upper portion of the reactor and allowing the water to pass through the inner tubes, flow through the outer tubes in the opposite direction and then flow out from the outer tube outlet in the upper portion of the reactor, is able to control the reaction temperature inside the reactor to be from 210 to 280° C., while also being able to obtain steam at a temperature of 200 to 270° C. and a pressure of 2 to 6 MPaG from the outer tube outlet. In addition, in the aforementioned heat removal mechanism, control of the temperature inside the reactor can be controlled to be in a range of ±2° C. variation in the reaction temperature inside the reactor.

In accordance with a bubble column-type slurry bed reaction system and apparatus of the present invention, since the system and apparatus are driven by the driving force (air lift) of synthesis gas that rises through the inside of the slurry bed reactor after being introduced from the bottom of said reactor without using an external drive power source for circulation, and is able to separate and derive liquid hydrocarbon products and gaseous hydrocarbon products formed without using an external drive power source for separation, there is less susceptibility to the occurrence of attrition (physical destruction) of the catalyst particles, thereby making it possible to reduce deterioration of performance. In addition, since there is little susceptibility to the occurrence of attrition, high-performance, inexpensive catalysts can be arbitrarily selected and used from available Fischer-Tropsch synthesis catalysts without being restricted to only specific catalysts that emphasize crush strength. In addition, since it is possible to monitor circulation condition and because the internal structure is simple, the occurrence of problems can be handled more quickly. Moreover, maintenance can be performed easily when a problem occurs. In addition, since there is no need to use a filter or external drive power source, and both the apparatus configuration and operating system can be simplified, running costs can be reduced.

In accordance with a bubble column-type slurry bed reaction system and apparatus of the present invention, since the system and apparatus have a process that allows heat of reaction to be uniformly removed in both the vertical axis direction and radial direction of the reactor by controlling the temperature inside the reactor with a plurality of cooling tubes composed of cooling medium feed inner tubes and heat exchange outer tubes, the heat can be uniformly removed from inside the reactor. As a result, the variation in the reaction temperature inside the reactor can be controlled to be in a range of ±2° C. (refer to Table 1 of the examples).

As a result, a bubble column-type slurry bed reaction apparatus can be provided that has a simple operating system that synthesizes liquid hydrocarbons by the Fischer-Tropsch synthesis reaction, and separates and derives catalysts and liquid hydrocarbon products from a slurry composed of gas, liquid and solid phases. Moreover, 99% or more of those catalyst particles introduced to the lower portion of a separation vessel from the upper portion of the bubble column-type slurry bed reactor can be circulated to the reactor by carrying out gravity separation (sedimentation separation) utilizing the difference in density between catalyst particles and liquid hydrocarbon products. Accordingly, liquid hydrocarbon products can be separated and derived easily by only sedimentation separation (gravity separation) from the catalyst particles by using catalyst particles having a particle diameter of 20 μm or more for the total amount of catalyst particles. In addition, maintenance can be performed easily when a problem occurs. Moreover, this system and apparatus also offer the advantage of making it easy to monitor circulation condition.

Figure 1:
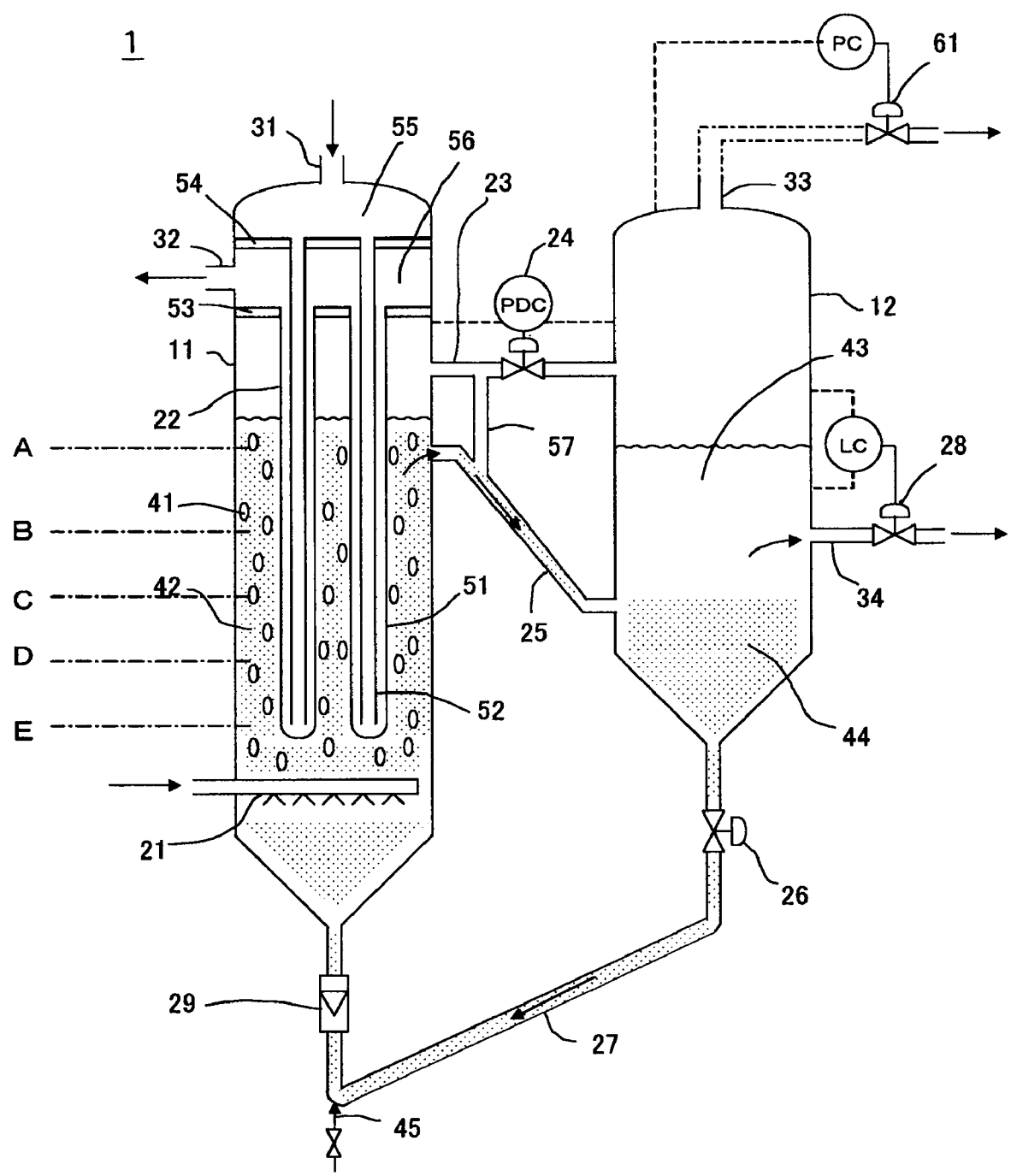
FIG. 1 is a configuration drawing of an example of a bubble column-type Fischer-Tropsch synthesis slurry bed reaction apparatus used in the present invention.

| EXPLANATION ON SYMBOLS | |
|---|---|
| 1 | FT synthesis reaction apparatus |
| 11 | Bubble column-type slurry bed FT synthesis reactor |
| 12 | Separation vessel |
| 21 | Gas distributor |
| 22 | Heat exchange tube |
| 23 | Horizontal connecting pipe |
| 24 | Differential pressure control valve |
| 25 | Downwardly inclined transfer pipe |
| 26 | Slurry circulation flow rate control valve (low differential pressure ball valve) |
| 27 | Slurry circulation pathway |
| 28 | Liquid level control valve |
| 29 | Flow meter |
| 31 | Boiler water inlet |
| 32 | Boiler water and steam outlet |
| 33 | Gaseous components derivation outlet |
| 34 | Liquid hydrocarbon derivation pipe |
| 41 | Bubbles |
| 42 | Slurry |
| 43 | Liquid products |
| 44 | Catalyst particle-concentrated slurry |
| 45 | Aeration gas supply nozzle |
| 51 | Outer tube |
| 52 | Inner tube |
| 53 | Tube seat |
| 54 | Tube seat |
| 55 | Inner tubes header |
| 56 | Outer tubes header |
| 57 | Vertical connecting pipe |
| 61 | Gaseous components outflow control valve |

BEST MODE FOR CARRYING OUT THE INVENTION

The following provides a detailed explanation of a bubble column-type slurry bed reaction system of the present invention based on FIG. 1. FIG. 1 is a configuration drawing of an example of a bubble column-type Fischer-Tropsch (FT) synthesis slurry bed reaction apparatus.

In an FT synthesis slurry bed reaction apparatus 1 shown in FIG. 1, a synthesis gas having a hydrogen/carbon monoxide molar ratio suitable for FT synthesis is continuously supplied from a gas distributor 21 installed in the bottom of a bubble column-type slurry bed FT synthesis reactor 11, and is dispersed into the reactor 11 in the form of bubbles.

Here, the molar ratio of the hydrogen to carbon monoxide of the synthesis gas suitable for FT synthesis is preferably 1.9 to 2.1. If the molar ratio of hydrogen to carbon monoxide is within this range, roughly the entire amount can be supplied to the FT synthesis reaction of the aforementioned general formula (1), and the conversion efficiency (FT synthesis oil production efficiency) for the target liquid hydrocarbon products (FT synthesis oil) can be enhanced. Furthermore, the composition of the synthesis gas may be such that, in addition to hydrogen and carbon monoxide gas, a hydrocarbon gas such as methane is also contained as shown in Table 1 of the examples. Moreover, there are also cases in which carbon dioxide is contained depending on the raw materials of the synthesis gas and production conditions, and this may be removed as necessary according to the operating conditions and so forth.

In addition, there are no particular limitations on the flow rate of the synthesis gas required to operate the apparatus, provided it allows operation by the driving force (air lift) of synthesis gas that rises through the slurry bed reactor introduced from the bottom of said reactor without using an external drive power source for circulation. However, it is preferable to suitably determine the flow rate so as to satisfy the superficial gas velocity conditions and so forth to be described later, and to ensure a superior reaction efficiency through contact with catalyst particles during the residence time the synthesis gas rises through the reactor according to the size of the reactor, its internal shape and so on. In addition, although there are no particular limitations on the size of the bubbles of the synthesis gas supplied from the gas distributor provided it allows obtaining of the desired synthesis gas driving force (air lift) for the same reasons as previously described, it is preferably suitably determined so as to satisfy the superficial gas velocity conditions and so forth described later.

In addition, there are no particular limitations on the shape of the gas distributor 21, provided it allows synthesis gas to be supplied uniformly relative to the reactor cross-section, and known one in the prior art can be used as suitable.

Next, the dispersed synthesis gas causes the formation of reaction products containing liquid hydrocarbons by contacting catalyst particles suspended in a medium while rising through the reactor 11.

Inside the reactor 11, bubbles 41 composed of synthesis gas, gaseous reaction products and unreacted gas and a slurry 42 composed of catalyst and liquid reaction products flow in a suspended state. The operating conditions of the reactor consist of a pressure of 1 to 4 MPaG, temperature of 210 to 280° C. and superficial gas velocity of about 0.05 to 0.20 m/second.

Slurry 42 is favorably mixed in the vertical axis and radial directions of the reactor accompanying the agitating more of the bubbles 41 under the aforementioned superficial gas velocity conditions. As a result of employing these operating conditions, a maximum CO conversion of 90% can be achieved in general formula (1) representing the previously described FT synthesis reaction.

Here, the liquid hydrocarbon products (FT synthesis oil) are preferably used for the initially charged solvent. However, there are no particular limitations on the initially. charged solvent, provided it does not have an effect on the application of the liquid hydrocarbon products or FT synthesis reaction after being derived together with the liquid hydrocarbon products, and should be able to form a slurry by suspending catalyst particles. This initially charged solvent is replaced with liquid hydrocarbon products (FT synthesis oil) subsequently formed during the continuous operation.

The aforementioned catalyst is in the form of particles, and any Fischer-Tropsch synthesis catalyst known in the prior art can be suitably used, provided it allows the formation of a slurry by being suspended in a medium, the details of which are described later.

In the case that the reaction pressure of the aforementioned reactor is less than 1 MPaG, there is the possibility of catalyst activity being inadequate, while in the case that it exceeds 4 MPaG, there is the possibility of increasing the cost of the reactor. In the case that the reaction temperature is lower than 210° C., there is the possibility of catalyst activity being inadequate, while in the case that it exceeds 280° C., there are many cases in which the conditions are not suitable for an FT synthesis reaction, although dependent on the catalyst used. In the case that the superficial gas velocity is less than 0.05 m/second, it is becomes difficult for the agitating move of the bubbles to occur, thereby resulting in the possibility of inadequate mixing of the slurry. In the case that the superficial gas velocity exceeds 0.20 m/second, the volume of gas inside the reactor becomes excessively large, resulting in the possibility of increasing the cost of the reactor. In addition, there are no particular limitations on the concentration of the catalyst (solid component) in the slurry under the aforementioned operating conditions, provided it satisfies the aforementioned superficial gas velocity, and is normally within the range of 10 to 40% by weight and preferably 20 to 30% by weight. In the case that the catalyst concentration in the slurry is less than 10% by weight, there is the possibility of the reactor becoming too large compared to the production needed. In the case the catalyst concentration exceeds 40% by weight, it becomes difficult for the catalyst to be dispersed (mixed) in the slurry, thereby resulting in the risk of the FT synthesis reaction being unable to proceed adequately. The aforementioned reactor operating conditions can be controlled by cooling tubes and various control valves provided in the reactor as will be described later, or by the flow rate of the synthesis gas and catalyst concentration.

Next, slurry 42, in which liquid hydrocarbons formed by the FT synthesis reaction and catalyst particles are suspended, is supplied to the lower portion of a separation vessel (12) through a downwardly inclined transfer pipe 25 installed in the upper portion of the reactor. The angle of inclination of the downwardly inclined transfer pipe 25 is preferably 30 to 45 degrees, and the slurry transfer velocity is preferably about 0.4 to 1.6 m/second.

Furthermore, in the case that the slurry transfer velocity is less than 0.4 m/second, there is the possibility of a portion of the catalyst particles accumulating in the bottom of the pipe as a result of unstable slurry circulation, which in turn has the possibility of causing inadequate mixing of slurry inside the reactor.

Although FIG. 1 shows an embodiment in which a single separation vessel 12 is provided, the present invention is not limited to this, but rather a plurality of separation vessels may also be provided. However, only one separation vessel should be provided from the viewpoint of simplifying the apparatus and operating system. Similarly, although the embodiment shown in FIG. 1 depicts a single downwardly inclined transfer pipe between the reactor and separation vessel, the present invention is not limited to this, but rather a plurality of such pipe may also be provided. However, a single pipe is appropriate from the viewpoint of simplifying the apparatus and operating system.

Next, slurry supplied to the lower portion of the separation vessel 12 is separated by gravity in the separation vessel 12 into a liquid products 43, from which the majority or all of the catalyst particles have been separated, and a catalyst particle-concentrated slurry 44 due to the difference in density between the catalyst particles and liquid products. Liquid products 43 is sent out to be used in a downstream process such as liquid hydrocarbon separation and purification equipment from a derivation pipe 34 (liquid products derivation portion) installed at an intermediate portion of the separation vessel 12 (below the range of the fluctuation of the level of liquid during stable operation of the apparatus) while controlling the liquid level in the separation vessel 12 with a liquid level control valve 28. Gravity-separated catalyst particle-concentrated slurry 44 is circulated to the bottom of the reactor 11 through a slurry circulation pathway 27 and a flow rate control valve 26, to be reused as catalyst for the FT synthesis reaction. The slurry circulation velocity is preferably about 0.4 to 1.6 m/second.

The gas phase space in the upper portion of the reactor 11 and the gas phase space in the upper portion of the separation vessel 12 are connected with a horizontal connecting pipe 23, being connected to the downwardly inclined transfer pipe 25 with a vertical connecting pipe 57, and the pressure difference between the gas phase space in the upper portion of the reactor 11 and the gas phase space in the upper portion of the separation vessel 12 is controlled with a differential pressure control valve 24. The gaseous products separated in the reactor 11, separation vessel 12 and downwardly inclined transport pipe 25 and the gaseous components of the unreacted synthesis gas are sent outside the system from a derivation outlet 33 installed in the apex of the separation vessel 12, and their flow rate is controlled by the gaseous components outflow control valve 61. Furthermore, the aforementioned connecting pipes should enable the gaseous components formed in the reactor to be transferred to the separation vessel by passing through pipes connected between the gas phase portions of the reactor and separation vessel. Thus, in addition to the pipe connected horizontally between the reactor 11 and the separation vessel 12 (horizontal connecting pipe 23) shown in FIG. 1, these connecting pipes may also be connected at an angle, and there are no particular limitations thereon.

The method used by the bubble column-type slurry bed reaction system of the present invention to separate catalyst particles and liquid hydrocarbon products is such that, in the gravity separation within the separation vessel 12, the velocity at which the liquid products 43, from which the majority or all of the catalyst particles have been separated, passes through the separation vessel is controlled to be 0.4 times or less the terminal sedimentation velocity of catalyst particles having a particle diameter of 20 μm, and as a result, realizes a separation efficiency of 99% or more for catalyst particles having a particle diameter of 20 μm or more. As a result, since the catalyst particles are not subjected to filtration or drive power, there is little susceptibility to catalyst attrition (physical destruction), which in turn leads to catalyst stability (long service life). Consequently, deterioration of performance can be inhibited and costs can be reduced.

On the basis of the above, the use of catalyst particles having a particle diameter of 20 μm or more as specified by sieving and so forth can be said to be preferable in the present invention. Namely, in cases in which the catalyst particles contain a large amount of particles having a particle size of less than 20 μm, even if the velocity at which the liquid products rises through the separation vessel is controlled as previously described, it is difficult to separate catalyst particles having a smaller particle diameter using gravity. As a result of using sufficiently large particles, liquid products can be derived in which the catalyst particles have been separated by gravity (sedimentation separation). However, since a minute amount of catalyst particles can become mixed into the derived liquid of liquid products due to attrition of the catalyst and so forth during continuous operation, an auxiliary filter may be provided at the liquid products derivation outlet.

The velocity at which the liquid products 43 rises through the separation vessel is controlled by the operating control valves 24, 26 and 28, and substantially controlled by operating low differential pressure ball valves in the form of the slurry circulation flow rate control valve 26 and the liquid products derivation control valve 28, and the rise velocity of the oil formed in the separation vessel 12 (liquid hydrocarbon products) is maintained at 0.4 times or less the terminal sedimentation velocity of catalyst particles having a particle diameter of 20. In addition, the rise velocity of oil formed in the separation vessel 12 (liquid hydrocarbon products) is determined from the flow rate of the formed oil derived from the derivation pipe 34. Here, in the case that the rise velocity of oil formed inside the separation vessel 12 (liquid hydrocarbon products) is greater than 0.4 times the terminal sedimentation velocity of catalyst particles having a particle diameter of 20 μm, it becomes difficult to realize separation efficiency of 99% or more for catalyst particles having a particle diameter of 20 μm or more. Namely, there is the risk of it becoming difficult to separate catalyst particles and liquid hydrocarbon products using gravity separation instead of filtration separation in the manner of the prior art.

As has been described above, the present invention is characterized by a slurry, in which catalyst particles and liquid products are suspended, naturally circulating between a reactor 11 and a separation vessel 12 without using a pump or other external drive power source due to a driving force (air lift) generated when bubbles of the synthesis gas supplied from the bottom of reactor 11 rise through the slurry, and the difference in density between fluids respectively present in reactor 11 and separation vessel 12. The circulation velocity of the slurry is controlled to be about 0.4 to 1.6 m/second by a low differential pressure ball valve 26 and a flow meter 29 installed in the vertical portion of the slurry circulation pathway 27. In addition, since the operation of circulating the slurry is carried out by natural circulation, a bubble column-type slurry bed reaction system can be provided that achieves stable operation for a long period of time without causing wear or destruction of catalyst particles. Moreover, since the bubble column-type slurry bed reaction system of the present invention separates and derives liquid hydrocarbon products from catalyst particles without using an external drive power source, a bubble column-type slurry bed reaction system can be provided that has low running costs.

The following provides a more detailed description of the flow rate control method used in the bubble column-type slurry bed reaction system of the present invention.

As was previously described, the slurry circulation velocity is controlled to be about 0.4 to 1.6 m/second by a slurry circulation flow rate control valve 26 installed in the bottom of the circulation pathway 27.

An aeration gas supply nozzle 45 is preferably installed in the circulation pathway 27 to further smoothen the circulation of slurry. Nitrogen, hydrogen or synthesis gas can be used for the aeration gas as long as it does not deactivate catalyst activity. Supply nozzles 45 are preferably installed at a plurality of locations in the circulation pathway 27 as necessary. This aeration gas is constantly or intermittently injected to increase the slurry circulation driving force, and is particularly important at the start of slurry circulation when there is considerable inertial resistance.

A differential pressure control valve 24 that controls the pressure difference between the two columns is installed in the horizontal connecting pipe 23 between the reactor 11 and the separation vessel 12. A low differential pressure ball valve is used for the differential pressure control valve 24. The difference between the respective liquid levels in the reactor 11 and separation vessel 12 is suitably maintained by the differential pressure control valve 24 to realize stable natural circulation of slurry. In addition, the horizontal connecting pipe 23 and downwardly inclined transfer pipe 25 are connected by a vertical connecting pipe 57. This vertical connecting pipe 57 prevents overflow of slurry from the horizontal connecting pipe 23 into the separation vessel 12 due to excessive rising of the level of the slurry in the reactor 11, and has the effect of separating bubbles that have entered the downwardly inclined transfer pipe 25, thereby promoting the gravity separation of catalyst particles, liquid products and gaseous components in the separation vessel 12.

The FT synthesis catalyst used in the bubble column-type slurry bed reaction system of the present invention is in the form of particles and enables the formation of a slurry by being suspending in a medium oil. Cobalt or ruthenium catalysts, for example, are preferably used. The particle diameter of the FT synthesis catalyst is 20 μm or more, and the mean particle diameter is preferably within the range of 50 to 150 μm.

Heat exchange tubes 22 are inserted into the reactor 11 to remove the large amount of heat generated accompanying the FT synthesis reaction in the bubble column-type FT synthesis slurry bed reaction system of the present invention. Although there are no particular limitations on the cooling method that these heat exchange tubes use, bayonet-type cooling tubes are used in FIG. 1 since they are superior for controlling temperature distribution temperature profile. In the embodiment shown in FIG. 1, a plurality of bayonet-type cooling tubes composed of cooling medium feed inner tubes and heat exchange outer tubes are installed vertically from the upper portion of the reactor to control the temperature inside the reactor and enable uniform removal of heat in the radial and vertical axis directions within said reactor. The structure of these tubes is composed of an outer tube 51 and an inner tube 52, they are disposed at a suitable pitch (and preferably a triangular pitch) on tube seats 53 and 54, respectively, and they have a boiler water inlet 31 and a boiler water and steam outlet 32. Inside the tubes, cooling water from the boiler water inlet is supplied to the inner tube 52 of each tube through the inner tube header 55, steam is generated from a portion of the boiler water by the heat generated by the FT synthesis reaction when it passes through the outer tube 51, the mixed phase fluid of steam and water is sent out from the outlet 32 after passing through the outer tube header 56, and the generated steam is recovered in the form of plant steam. The operating conditions consist of a pressure of 2.0 to 6.0 MPaG and a temperature of 200 to 270(C, and the ratio of steam generated from the boiler water by removing the heat generated by the FT synthesis reaction is preferably 5 to 10% by weight. The bayonet-type cooling tubes are able to uniformly control the temperature distribution temperature profile in the reactor by efficiently removing the large amount of heat generated accompanying the FT synthesis reaction (roughly 40 Mcal/kgmol-CO), thereby realizing stable operation. In addition, since the structure of the system is characterized by the presence of expansion of freedom at the bottom of the tubes, it is not necessary to take into consideration the problem of thermal expansion of the cooling tubes during operation. Vibration of the cooling tubes can be prevented to enable stable operation by causing the flow pattern in the outer tubes in the form of dual phase flow in a vertical tube to approach a annual/atomized flow as a result of operating while making the ratio of steam generated from the boiler water be 5 to 10% by weight.

Here, the operating conditions of the cooling apparatus are preferably set so as to obtain steam at a pressure of 2.0 to 6.0 MPaG and a temperature of 200 to 270 (C from the cooling tube outer tube outlet by feeding water (for example, boiler water) into the cooling tube inner tube. The temperature inside the reactor is also preferably controlled to be 210 to 280(C. In the case of using the aforementioned bayonet-type cooling tubes in particular, the resulting control of the temperature inside the reactor can be carried out stably at a range of variation in the reaction temperature inside the reactor of (5 (C and preferably (2 (C (refer to Table 1 in the examples described later).

Furthermore, although it is difficult to universally define the positional relationship between the reactor and separation vessel used in the bubble column-type slurry bed reaction system of the present invention due to differences in the size of the two vessels and so forth, a positional relationship may be taken that allows circulation of slurry, and there are no particular limitations on this relationship provided the gas phase portions of the reactor 11 and the separation vessel 12 are connected with a pipe in the manner of the connecting pipe 23 as shown in FIG. 1, and the effects and action in the form of the slurry moving to the lower portion of the separation vessel 12 through the transfer pipe 25 of the invention of the present application are not impaired.

The following provides an explanation of examples of the present invention.

EXAMPLE 1

The reaction apparatus shown in FIG. 1 was used for the reaction apparatus.

Liquid hydrocarbon was produced by an FT synthesis reaction by supplying synthesis gas at a feed rate of 250 $Nm^3$hour (100% load) and controlling the reaction pressure to be 2200 kPaG and the reaction temperature to be 240° C. (±2° C.). The results are shown in Table 1. In addition to controlling the reaction temperature inside the reactor to be in the aforementioned temperature range, boiler water was fed into the inner tubes of a plurality of bayonet-type cooling tubes, and controlled so as to obtain steam having a temperature of 231° C. and a pressure of 2735 kPaG from the cooling tube outer tube outlet. In addition, the CO conversion during this FT synthesis reaction was 62% under these operating conditions.

The temperature profile inside the reactor demonstrated a uniform temperature profile in which the temperature difference in the direction of the vertical axis of the reactor was 2° C. or less under the conditions of a superficial gas velocity of 0.15 m/second, and heat generated by the FT synthesis reaction was confirmed to be efficiently removed by the bayonet-type cooling tubes. Under the conditions of Example 1, FT synthesis oil (liquid hydrocarbon) was produced at 5.0 barrels/day.

EXAMPLE 2

A liquid hydrocarbon was produced by an FT synthesis reaction by supplying a synthesis gas at a feed rate of 100 $Nm^3$hour (40% load) and controlling the reaction pressure to be 2200 kPaG and the reaction temperature to be 230° C. using the same reaction apparatus as in Example 1. The results are shown in Table 1. In addition to controlling the reaction temperature inside the reactor to be in the aforementioned temperature range, boiler water was fed into the inner tubes of a plurality of bayonet-type cooling tubes, and controlled so as to obtain steam having a temperature of 226° C. and a pressure of 2450 kPaG from the cooling tube outer tube outlet. In addition, the CO conversion during this FT synthesis reaction was 89% under these operating conditions.

The temperature profile inside the reactor demonstrated a uniform temperature profile in which the temperature difference in the direction of the vertical axis of the reactor was 1° C. or less under the conditions of a superficial gas velocity of 0.06 m/second, and heat generated by the FT synthesis reaction was confirmed to be efficiently removed by the bayonet-type cooling tubes. Under the conditions of Example 2, FT synthesis oil (liquid hydrocarbon) was produced at 2.6 barrels/day.

TABLE 1

| Example | 1 | 2 |
|---|---|---|
| Synthesis gas Composition (mol %) | | |
| H2 | 60.34 | 61.53 |
| CO | 29.41 | 30.09 |
| CH4 | 8.70 | 5.79 |
| CO2 | 0.00 | 0.00 |
| Flow rate (Nm$^3$/hr) | 250 | 100 |
| Reactor | | |
| Pressure (kPaG) | 2200 | 2200 |
| Temperature (° C.) | | |
| Upper portion (EL = 11950 mm) | 238  238 | 230  230 |
| Mid-upper portion (EL = 8100 mm) | 240  238 | 231  230 |
| Middle portion (EL = 5400 mm) | 240  240 | 230  230 |
| Mid-lower portion (EL = 2700 mm) | 240  240 | 229  229 |
| Lower portion (EL = 0 mm) | 240 | 229 |
| Superficial gas velocity (m/sec) | 0.15 | 0.06 |
| Separation Vessel | | |
| Liquid level (%) | 50 | 72 |
| Liquid level rise velocity (m/sec) | $3.7 \times 10^{-5}$ | $1.9 \times 10^{-5}$ |
| 20 μm particle terminal sedimentation velocity | $1.0 \times 10^{-3}$ | $1.0 \times 10^{-3}$ |
| Reactor/separation vessel | | |
| Superficial gas velocity (kPa) | 4.8 | 1.3 |
| Slurry circulation flow velocity (m/sec) | 0.75 | 0.78 |
| FT synthesis oil production (barrels/day) | 5.0 | 2.6 |

Furthermore, the temperatures of the reactor shown in Table 1 indicate the values of a temperature sensors provided at each location inside the reactor. However, the two values shown in the columns for the upper portion, mid-upper portion, middle portion and mid-lower portion of the reactor indicate the values of a plurality (two) of temperature sensors provided within the same plane of the reactor. The locations where the temperature sensors were installed in the direction of the vertical axis (upper portion: A, mid-upper portion: B, middle portion: C, mid-lower portion: D, lower portion: E (EL=0 mm)) are shown in FIG. 1. In addition, seven cooling tubes were disposed at a triangular pitch.

INDUSTRIAL APPLICABILITY

The present invention can be applied to a bubble column-type slurry bed reaction system and apparatus capable of synthesizing liquid hydrocarbons by the Fischer-Tropsch synthesis reaction.

The invention claimed is:

1. A bubble column-type slurry bed reaction system in a Fischer-Tropsch synthesis reaction system for producing liquid hydrocarbon products by contacting a synthesis gas composed of hydrogen and carbon monoxide with catalyst particles, the slurry bed reaction system comprising:
 a gas distributor arrangement configured to supply the synthesis gas continuously from a bottom of a reactor so that the synthesis gas contacts the catalyst particles that are suspended to form the liquid hydrocarbon products, gaseous hydrocarbon products, and water in a Fischer-Tropsch synthesis reaction procedure;
 a downwardly inclined transfer pipe arrangement configured to transfer the suspended liquid hydrocarbons formed in the Fischer-Tropsch synthesis reaction procedure and catalyst particles from the reactor to a lower portion of a separation vessel to separate the catalyst particles and the liquid hydrocarbon products; and
 a connecting pipe arrangement which is installed above the downwardly inclined transfer pipe arrangement and configured to supply the gaseous hydrocarbon products formed in the Fischer-Tropsch synthesis reaction procedure to an upper portion of the separation vessel,
 wherein:
  the slurry bed reaction system is configured such that the liquid hydrocarbon products are derived from the separation vessel,
  a slurry in which the catalyst particles are concentrated is derived from a bottom of the separation vessel and circulated to the bottom of the reactor, and is driven by a driving force of the synthesis gas introduced from the bottom of the reactor and which rises through the reactor without using an external drive power source for a circulation, and the formed liquid hydrocarbon products, gaseous hydrocarbon products and water are separated and derived without using the external drive power source for the separation, and
  the separation vessel includes a slurry circulation pathway that circulates a catalyst particle-concentrated slurry to the reactor and a liquid rise velocity inside the separation vessel is controlled to be 0.4 times or less of a sedimentation velocity of catalyst particles having a particle diameter of 20 μm by a catalyst-concentrated slurry derivation rate control valve installed in the slurry circulation pathway between the separation vessel and the reactor, a derivation rate control valve for the liquid hydrocarbon products derived from the separation vessel, and a differential pressure control valve in an upper gas phase space between the separation vessel and the reactor.

2. The bubble column-type slurry bed reaction system according to claim 1, wherein a temperature inside the reactor is controlled by a plurality of cooling tubes installed vertically from an upper portion of the reactor, and composed of cooling medium feed inner tubes and heat exchange outer tubes, and facilitating a uniform removal of heat in a radial direction and a vertical axial direction inside the reactor.

3. The bubble column-type slurry bed reaction system according to claim 1 or 2, wherein the slurry bed reaction system is configured such that a pressure of the reactor is 1 to 4 MPaG, and a superficial gas velocity inside the reactor is 0.05 to 0.2 m/second during the Fischer-Tropsch synthesis reaction procedure.

4. The bubble column-type slurry bed reaction system according to any of claims 1 or 2, wherein the slurry bed reaction system is configured such that 99% or more of those catalyst particles introduced to the lower portion of the separation vessel from the reactor having a particle diameter of 20 μm or more are circulated to the reactor.

5. The bubble column-type slurry bed reaction system according to claim 2, wherein the slurry bed reaction system is configured such that the temperature is controlled inside the reactor by feeding water into the cooling tube inner tubes to be at 210 to 280° C., and wherein the slurry bed reaction system is further configured such that a steam is maintained at a temperature of 200 to 270° C. and a pressure of 2 to 6 MPaG is obtained from a cooling tube outer tube outlet.

6. A Fischer-Tropsch synthesis reaction apparatus, comprising:
- a bubble column-type slurry bed Fischer-Tropsch synthesis reactor that forms liquid hydrocarbon products, gaseous hydrocarbon products and water by contacting synthesis gas continuously supplied from a gas distributor installed in a bottom of the reactor with suspended catalyst particles; and
- a circulation separation mechanism that is (a) driven by a driving force of the synthesis gas rising through the slurry bed reactor introduced from the bottom of the reactor without using an external drive power source for a circulation, and (b) separates and derives the formed liquid hydrocarbon products and gaseous hydrocarbon products without using the external drive power source for the separation, wherein:
- the circulation separation mechanism includes:
  - (a) the reactor,
  - (b) a separation vessel that separates catalyst particles and liquid hydrocarbon products by transferring a slurry, in which the liquid hydrocarbon products formed in the reactor and the catalyst particles are suspended, through a downwardly inclined transfer pipe arrangement connected between the reactor and a lower portion of the separation vessel,
  - (c) a gaseous hydrocarbon products derivation portion that transfers the gaseous hydrocarbon products formed in the reactor to an upper portion of the separation vessel through a connecting pipe installed above the downwardly inclined transfer pipe, and derives the gaseous products from its apex,
  - (d) a liquid hydrocarbon products derivation portion that derives the liquid hydrocarbon products from the separation vessel, and
  - (e) a circulation pathway that derives the slurry in which the catalyst particles have been concentrated from the bottom of the separation vessel, and circulates the circulation pathway to the bottom of the reactor,
- and wherein, in the separation circulation mechanism, a liquid rise velocity inside the separation vessel is controlled to be 0.4 times or less of a sedimentation velocity of the catalyst particles having a particle diameter of 20 μm by a catalyst-concentrated slurry derivation rate control valve installed in the slurry circulation pathway between the separation vessel and the reactor, a derivation rate control valve for the liquid hydrocarbon products derived from the separation vessel, and a differential pressure control valve in an upper gas phase space between the separation vessel and the reactor.

7. The Fischer-Tropsch synthesis reaction apparatus according to claim 6, wherein the Fischer-Tropsch synthesis reaction apparatus is configured such that a reaction pressure inside the reactor is controlled to be in the range of 1 to 4 MPaG and a superficial gas velocity is controlled to be in the range of 0.05 to 0.2 m/second.

8. The Fischer-Tropsch synthesis reaction apparatus according to claim 7, wherein the Fischer-Tropsch synthesis reaction apparatus is configured such that in the circulation separation mechanism, 99% or more of those particles introduced to the lower portion of the separation vessel having a particle diameter of 20 μm or more are circulated to the reactor.

9. The Fischer-Tropsch synthesis reaction apparatus according to claim 6 or 7, further comprising a heat removal mechanism that controls a temperature inside the reactor and enables uniform removal of heat in a radial direction and a vertical axis direction inside the reactor.

10. The Fischer-Tropsch synthesis reaction apparatus according to claim 9, wherein the heat removal mechanism has a plurality of cooling tubes comprised of cooling medium feed inner tubes and heat exchange outer tubes installed vertically from an upper portion of the reactor, and by feeding water into an inner tube inlet in the upper portion of the reactor, and facilitating the water to pass through the inner tubes, flow through the outer tubes in an opposite direction and then flow out from an outer tube outlet in the upper portion of the reactor, controls a reaction temperature inside the reactor to be at 210 to 280° C., while also obtaining steam at a temperature of 200 to 270° C. and a pressure of 2 to 6 MPaG from the outer tube outlet.

11. The Fischer-Tropsch synthesis reaction apparatus according to claim 9, wherein the heat removal mechanism is configured to control the temperature inside the reactor to be in a range of ±2° C. variation in the reaction temperature inside the reactor.

* * * * *